United States Patent
Hanzawa

(10) Patent No.: US 7,386,853 B2
(45) Date of Patent: Jun. 10, 2008

(54) MULTITASKING OPERATING SYSTEM CAPABLE OF REDUCING POWER CONSUMPTION AND VEHICLE ELECTRONIC CONTROL UNIT USING SAME

(75) Inventor: Kiichiro Hanzawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 671 days.

(21) Appl. No.: 10/162,566

(22) Filed: Jun. 6, 2002

(65) Prior Publication Data
US 2003/0014467 A1  Jan. 16, 2003

(30) Foreign Application Priority Data
Jul. 12, 2001 (JP) .............................. 2001-212487

(51) Int. Cl.
*G06F 9/46* (2006.01)
*G06F 1/00* (2006.01)
*G06F 1/26* (2006.01)

(52) U.S. Cl. .................. 718/108; 718/100; 713/300; 713/320; 713/323; 713/340

(58) Field of Classification Search ........ 713/300–340; 718/100, 108
See application file for complete search history.

(56) References Cited

U.S. PATENT DOCUMENTS

| 5,189,647 | A | | 2/1993 | Suzuki et al. | |
|---|---|---|---|---|---|
| 5,511,203 | A | * | 4/1996 | Wisor et al. | 713/322 |
| 5,554,978 | A | * | 9/1996 | Sakagami et al. | 340/3.4 |
| 5,560,021 | A | * | 9/1996 | Vook et al. | 713/323 |
| 5,621,250 | A | * | 4/1997 | Kim | 307/10.1 |
| 6,219,598 | B1 | * | 4/2001 | Miwa et al. | 701/36 |
| 6,260,150 | B1 | * | 7/2001 | Diepstraten et al. | 713/323 |
| 6,553,501 | B1 | * | 4/2003 | Yokoe | 713/320 |
| 6,816,977 | B2 | * | 11/2004 | Brakmo et al. | 713/323 |
| 6,931,555 | B2 | * | 8/2005 | Osborn | 713/320 |

FOREIGN PATENT DOCUMENTS

| EP | 499178 | 2/1992 |
|---|---|---|
| EP | 0499178 A1 * | 8/1992 |
| EP | 000499178 A1 * | 8/1992 |

(Continued)

OTHER PUBLICATIONS

US00RE36437E, Reissue of US 5,317,998, Issued Jun. 7, 1994.*

*Primary Examiner*—Meng-Al T. An
*Assistant Examiner*—Kenneth Tang
(74) *Attorney, Agent, or Firm*—Posz Law Group, PLC

(57) ABSTRACT

A real time operating system (RTOS) for a vehicle electronic control unit (ECU) switches the CPU of the vehicle ECU to a low-power-consumption (LPC) mode, if there is no task in a running state and no task in a ready state and the time left before a task in a suspended state is switched to the ready state is longer than a predetermined allowable minimum duration of the LPC mode. Duration of the LPC mode is set to a length shorter than the time left before a task in the suspended state is switched to the ready state. When an interrupt occurs or the duration of the LPC mode expires, the CPU is switched to a normal mode and temporary suspension of the system clock during the LPC mode is compensated for using the duration of the LPC mode.

10 Claims, 9 Drawing Sheets

FOREIGN PATENT DOCUMENTS

| | | |
|---|---|---|
| EP | 0794481 | 9/1997 |
| JP | A-62150416 | 4/1987 |
| JP | A-5094313 | 4/1993 |
| JP | A-H05-282214 | 10/1993 |
| JP | A-H06-67899 | 3/1994 |
| JP | A-8076874 | 3/1996 |
| JP | A-H09-128088 | 5/1997 |
| JP | A-H09-244768 | 9/1997 |
| JP | A-10143274 | 5/1998 |
| JP | A-10-341187 | 12/1998 |
| JP | A-2001-109538 | 4/2001 |

* cited by examiner

FIG. 6

|  | ALARM A | ALARM B | ALARM C |  |
|---|---|---|---|---|
| t1 → | 100 | 10 | 120 | ↕ UNIT TIME (5ms) |
|  | 99 | 9 | 119 |  |
|  | 98 | 8 | 118 |  |
|  | ⋮ | ⋮ | ⋮ |  |
| t2 → | 90 | 0 | 110 |  |
| t3 → | 89 |  | 109 |  |
|  | ⋮ |  | ⋮ |  |
| t4 → | 0 |  | 100 |  |
|  |  |  | ⋮ |  |
|  |  |  | 0 |  |

…

MULTITASKING OPERATING SYSTEM CAPABLE OF REDUCING POWER CONSUMPTION AND VEHICLE ELECTRONIC CONTROL UNIT USING SAME

CROSS REFERENCE TO RELATED APPLICATION

The present application is based on and incorporates herein by reference Japanese Patent Application No. 2001-212487 filed on Jul. 12, 2001.

BACKGROUND OF THE INVENTION

1. Field of the Invention

The present invention relates to a multitasking operating system.

2. Related Art

In some of computer systems, the CPU of a microcomputer operates in a normal mode and a low-power-consumption (LPC) mode. In the LPC mode, the CPU operates at a lower clock frequency or supply of the clock is suppressed for reducing power consumption. When the CPU switches from the normal mode to the LPC mode, execution of some programs is stopped. Therefore the computer system includes a dedicated program which determines proper time for switching from the normal mode to the LPC mode and proper duration of the LPC mode. Thereby the CPU is switched between the normal mode and LPC mode so that the operation of the computer system is not disrupted.

A door electronic control unit (ECU), which is a computer system that includes a microcomputer, controls the door lock in a vehicle switching between a normal mode and an intermittent mode (i.e., LPC mode). Referring to FIG. 8, the door ECU in the normal mode executes processes A, B, C, . . . , n every 5 ms, for example. Each of the processes A, B, C, . . . , n is an application program which implements a predetermined function. For example, the process A implements a keyless entry system, while the process B implements a door lock system.

Each of the processes A, B, C, . . . , n sets a flag, which indicates whether the LPC mode is acceptable or not, during the execution. The process B sets the flag on for indicating that the process B can accept the LPC mode, if the elapsed time after the doors are locked reaches ten minutes.

After the execution of the processes A, B, C, . . . , n completes, a manager process determines whether the CPU should operate in the normal mode or the LPC mode based on the flags. If all the flags are on, that is, all the processes A, B, C, . . . , n can accept the LPC mode, the manager sets the CPU in the LPC mode. If at least one of the flags are off, the manager sets the CPU in the normal mode.

Referring to FIG. 9, in the normal mode, the CPU executes the processes A, B, C, . . . , n every 5 ms (T1) as described above. However, the CPU may execute the processes A, B, C, . . . , n every 300 ms (T2), and then the CPU is set in the LPC mode during a time interval T3 between the completion of execution of the processes A, B, C, . . . , n and the beginning of next execution of the processes A, B, C, . . . , n. Thus the CPU is switched between the normal mode and the LPC mode so that the execution of the processes A, B, C, . . . , n is not disrupted.

However, a series of processes A, B, C, . . . , n to be repeatedly executed at regular intervals is difficult to program on a large scale. Further time (T0 in FIG. 9) required for executing the series of processes A, B, C, . . . , n may be sometimes long, and the responsiveness of the system is lowered in this case. In order to overcome this problem, a multitasking operating system such as a real time operating system (RTOS) is employed. The multitasking operating system treats a plurality of processes of a program as tasks, and executes the program switching tasks. Thus the multitasking operating system includes not only a mechanism for regularly executing a program, but also a mechanism for executing a program circumstantially switching tasks.

When the multitasking operating system executes a program switching tasks, the states of the tasks are always changing according to the priority and depending on occurrence of interrupts and issue of system calls. Accordingly a time interval between the completion of execution of the tasks and the beginning of next execution of the tasks cannot be easily estimated. Further the proper time for switching the CPU into the LPC mode cannot be easily determined.

SUMMARY OF THE INVENTION

The present invention has an object to provide a multitasking operating system which switches the CPU of a microcomputer between a normal mode and a low-power-consumption (LPC) mode so that execution of programs is not disrupted.

An operating system according to the present invention controls operation of the CPU of a microcomputer. The operating system includes first means for managing a plurality of tasks, and second means for switching the CPU to a LPC mode. The plurality of tasks are switched among a running state, a ready state and a third state. The second means switches the CPU to the LPC mode if there is no task in the running state and no task in the ready state. The duration of the LPC mode is determined based on the minimum of time left before a task in the third state is switched to the ready state, if there is a task in the third state and time left before the task is switched to the ready state is known.

Preferably, the operating system switches the CPU into the LPC mode only when the minimum of time left before a task in the third state is switched to the ready state is longer than a predetermined allowable minimum duration of the LPC mode. Further the operating system sets the duration of the LPC mode to a length shorter than the minimum of time left before a task in the third state is switched to the ready state.

BRIEF DESCRIPTION OF THE DRAWINGS

The above and other objects, features and advantages of the present invention will become more apparent from the following detailed description made with reference to the accompanying drawings. In the drawings:

FIG. 6 is a schematic diagram showing how alarms corresponding to the respective tasks are decremented;

DETAILED DESCRIPTION OF THE PREFERRED EMBODIMENT

Figure 1:
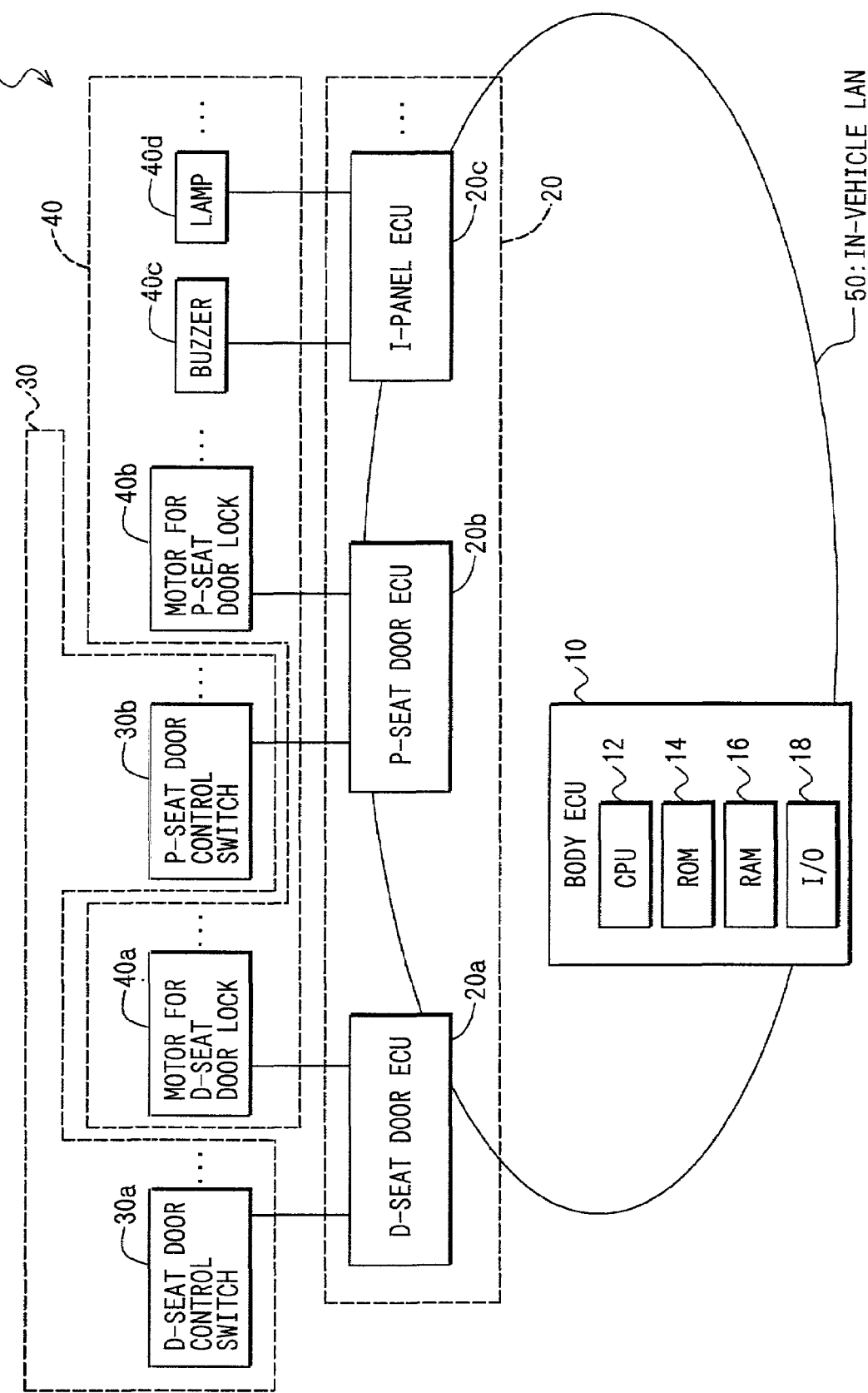
FIG. 1 is a block diagram showing a body system that includes a body ECU on which a real time operating system (RTOS) according to an embodiment of the present invention is installed.

An operating system according to an embodiment of the present invention is installed on the body ECU of the body system of a vehicle. Referring to FIG. 1, the body system 100 includes a body ECU 10 and other ECUs 20 which are a driver's seat (D-seat) door ECU 20a, a passenger seat (P-seat) door ECU 20b, and an instrument panel (I-panel) ECU 20c. The ECUs 10, 20 are connected to the in-vehicle LAN 50, and therefore the body ECU 10 can communicate with each of the other ECUs 20 via the in-vehicle LAN 50. Each of the ECUs 10, 20 is a computer system which includes a central processing unit (CPU), ROM, RAM, and an I/O subsystem. The body ECU 10 is connected to the in-vehicle LAN 50 through the I/O subsystem 18. Each of the ECUs 20 is connected to an input device 30, output devices 40 and the in-vehicle LAN 50 through the I/O subsystem.

Each of the ECUs 20 detects the state of the input device 30, and sends a packet signal that includes the information on the detected state of the input device 30 to the body ECU 10 via the in-vehicle LAN 50. Further each of the ECUs 20 receives a packet signal that includes control information from the body ECU 10 via the in-vehicle LAN 50, and controls the output device 40 based on the received control information.

The D-seat door ECU 20a is arranged in the door on the driver's side. A D-seat door control switch 30a is connected to the D-seat door ECU 20a as an input device 30. A motor 40a used for a D-seat door lock and a motor used for a D-seat power window are connected to the D-seat door ECU 20a as output devices 40. The P-seat door ECU 20b is arranged in the door on the passenger's side. A P-seat door control switch 30b is connected to the P-seat door ECU 20b as an input device 30. A motor 40b used for a P-seat door lock and a motor used for a P-seat power window are connected to the P-seat door ECU 20b as output devices 40. The I-panel ECU 20c is arranged in the instrument panel. A buzzer 40c and a lamp 40d are connected to the I-panel ECU 20c as output devices 40.

The body ECU 10 receives packet signals from the other ECUs 20, and monitors the state of the input devices 30 based on the information included in the packet signals. The body ECU 10 sends packet signals that include control information for instructing the ECUs 20 to control the output devices 40.

The real time operating system (RTOS) according to the present embodiment is stored in the ROM 14 of the body ECU 10, and executed by the CPU 12 for managing execution of an application program stored in the ROM 14. The RTOS treats processes of the application program as tasks, and executes the application program switching tasks. As a result, the body ECU 10 operates in the above-described manner while controlling the RAM 16 and the I/O subsystem 18 connected to the in-vehicle LAN 50. Further the RTOS manages various resources. For example, the RTOS manages the operation mode such as a power consumption mode.

Figure 2:
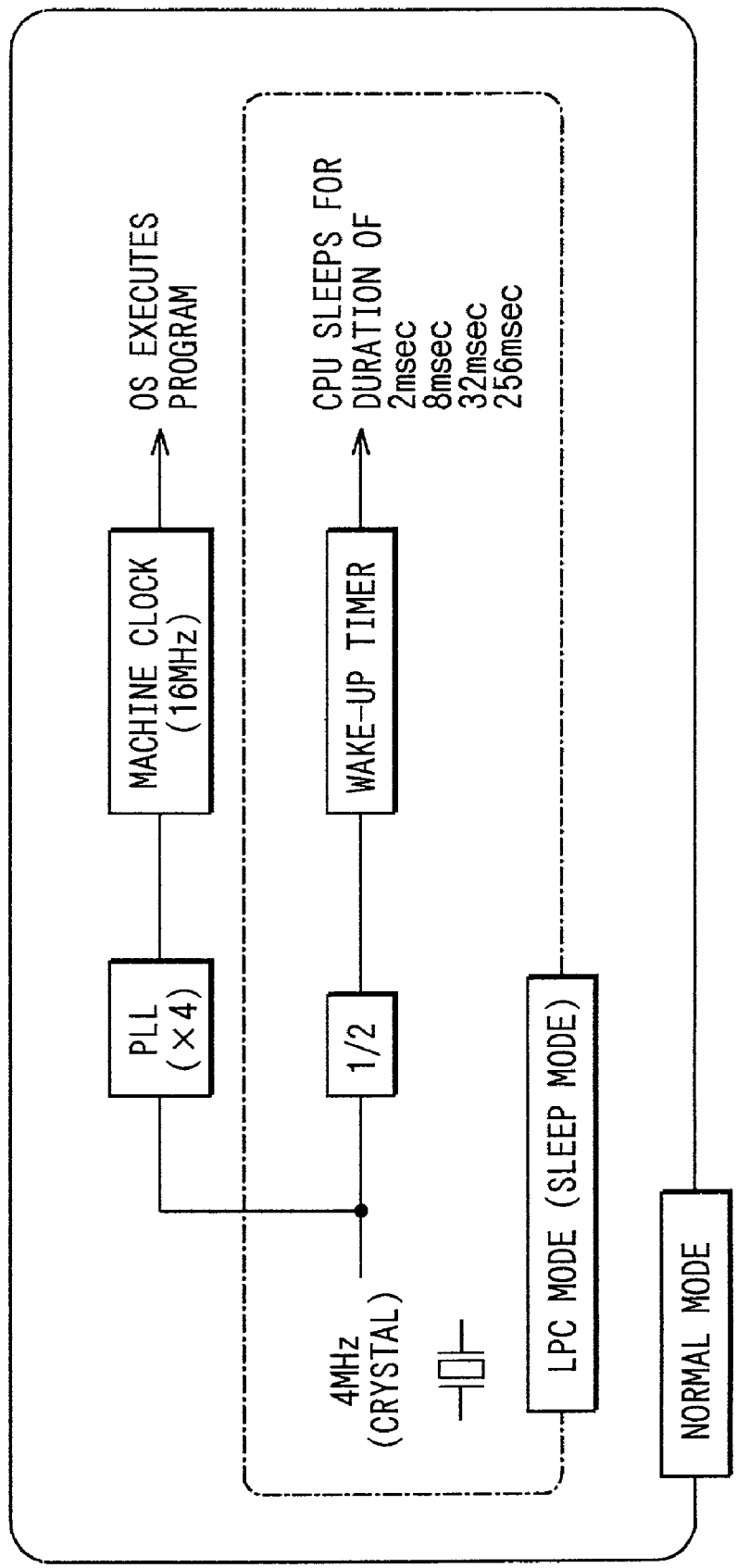
FIG. 2 is a schematic diagram showing how a normal mode and a low-power-consumption (LPC) mode are implemented in the CPU of the body ECU.

Referring to FIG. 2, the CPU 12 of the body ECU 10 operates in two operation modes, that is, a normal mode and a low-power-consumption (LPC) mode (i.e., sleep mode or standby mode). In the normal mode, the CPU 12 operates according to a machine clock at a frequency of 16 MHz (4 MHz×4), and thereby executes the program stored in the ROM 14. In the LPC mode, supply of the clock to the CPU 12 is suppressed so that the power consumption is reduced.

When the CPU 12 switches to the LPC mode, it first sets a wake-up timer for a predetermined duration of the LPC mode (i.e., sleep duration) and thereafter executes a sleep instruction. The CPU 12 switches from the LPC mode to the normal mode, if the actual duration of the LPC mode reaches the predetermined sleep duration. Further the CPU 12 switches from the LPC mode to the normal mode when an interrupt occurs, even if the actual duration of the LPC mode has not reach the predetermined sleep duration yet.

Figure 3:
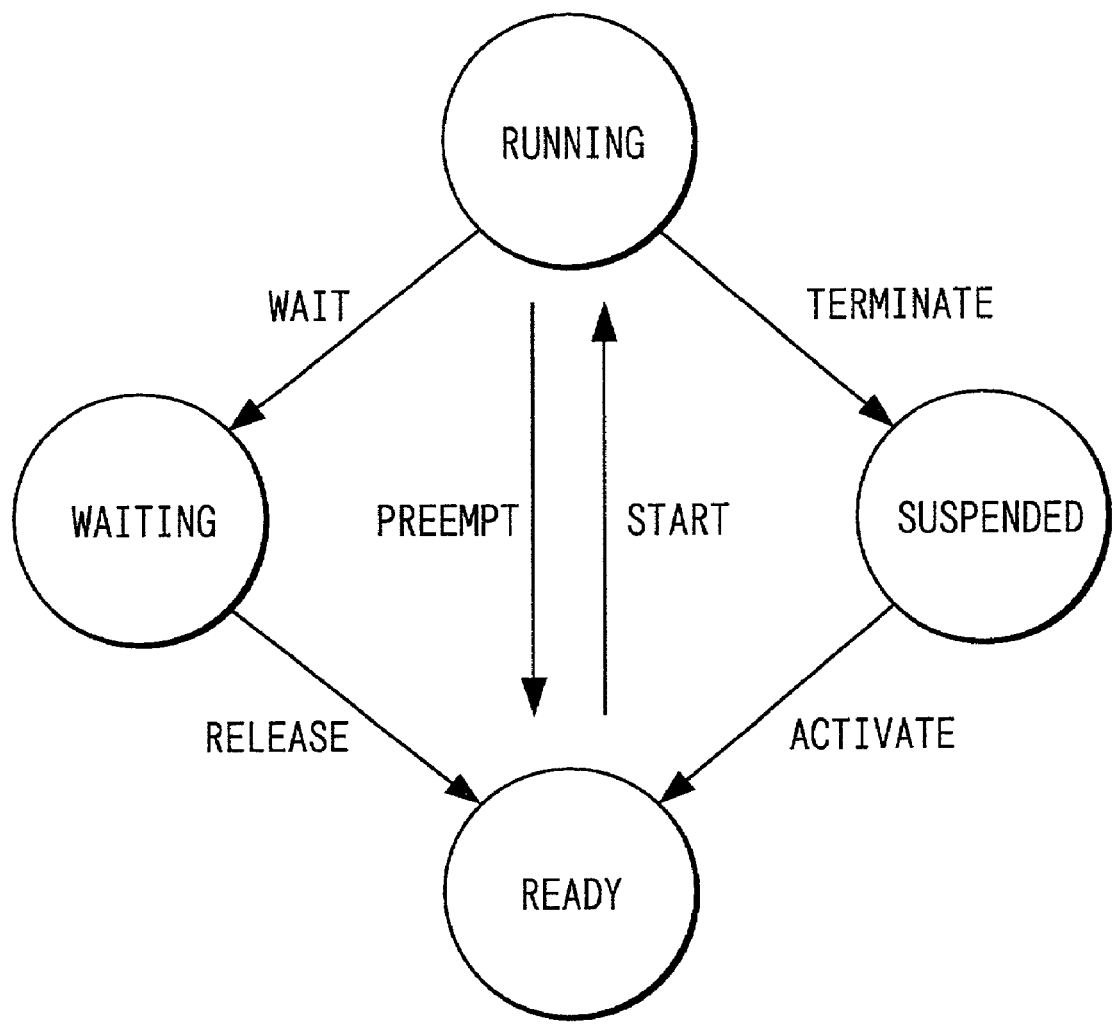
FIG. 3 is a state transition diagram of tasks which constitute a program executed by the CPU of the body ECU.

The RTOS manages the tasks as follows. Referring to FIG. 3, the RTOS switches each of the tasks among four states, that is, "running", "ready", "waiting", and "suspended". A task on execution is in "running" state. A task waiting to be executed is in "ready" state. A task waiting for an event to be generated for triggering execution of the task is in "waiting" state. A suspended task is in "suspended" state.

The maximum number of tasks in "running" state is equal to the number of tasks the body ECU 10 can simultaneously execute. Therefore the maximum number of tasks in "running" state is one in the present embodiment, because the body ECU 10 includes the single CPU. In contrast, the maximum number of tasks simultaneously in each of the other states is plural.

When execution of a "running" task is completed, the task issues a terminate task system call to the RTOS. In response to the terminate task system call, the RTOS switches the "running" task to "suspended" state. When a "running" task should wait for a predetermined event, the task issues a wait event system call to the RTOS. In response to the wait event system call, the RTOS switches the task to "waiting" state.

When a "running" task is switched to another state, the RTOS can newly begin to execute a task. Then the RTOS selects a task of highest priority from the tasks in "ready" state, and switches the selected task to "running" state. Then the selected task is dispatched and executed.

When a task of higher priority than a "running" task is switched to "ready" state, the RTOS switches the "running" task to "ready" state and then switches the task of higher priority to "running" state. Thus the RTOS preempts. That is, the RTOS according to the present embodiment is a preemptive multitasking operating system.

A task in "suspended" state is switched to "ready" state, if a predetermined condition is satisfied. The condition for switching is determined for each task. The condition is that (1) a timer (alarm) expires (i.e., the timer indicates that a set time has elapsed), (2) one of predetermined interrupts occurs, or (3) execution of a task to which the "suspended" task is chained is completed.

A task in "suspended" state is switched to "ready" state based on the condition (1) as follows. The timer (alarm) is provided for each task. By issuing a system call, the "running" task instructs the RTOS to activate a predetermined task after an interval of a predetermined time length (e.g., 100 ms). The RTOS sets the timer for the predetermined time length, and thereafter monitors the timer. When time of the predetermined length has elapsed, that is, when the timer expires, the RTOS switches the "suspended" task to "ready" state.

When an interrupt occurs, a task to be switched is selected according to the type of the interrupt and then switched to "ready" state. Thus a task in "suspended" state is switched to "ready" state based on the condition (2).

A task in "suspended" state is switched to "ready" state based on the condition (3) as follows. When the body ECU 10 should obtain information on the state of the door lock, the body ECU 10 first checks the state of the door lock on the inside and thereafter checks the state of the door lock on the outside. In this case, a task B for checking the state of the door lock on the outside is chained to a task for checking the state of the door lock on the inside beforehand, so that these tasks A, B are executed consecutively. If tasks A, B are thus set, task B is switched from "suspended" state to "ready" state when execution of task A is completed.

When a "running" task issues a set event system call, a task corresponding to an event specified by the set event system call is switched from "waiting" state to "ready" state.

Figure 4:
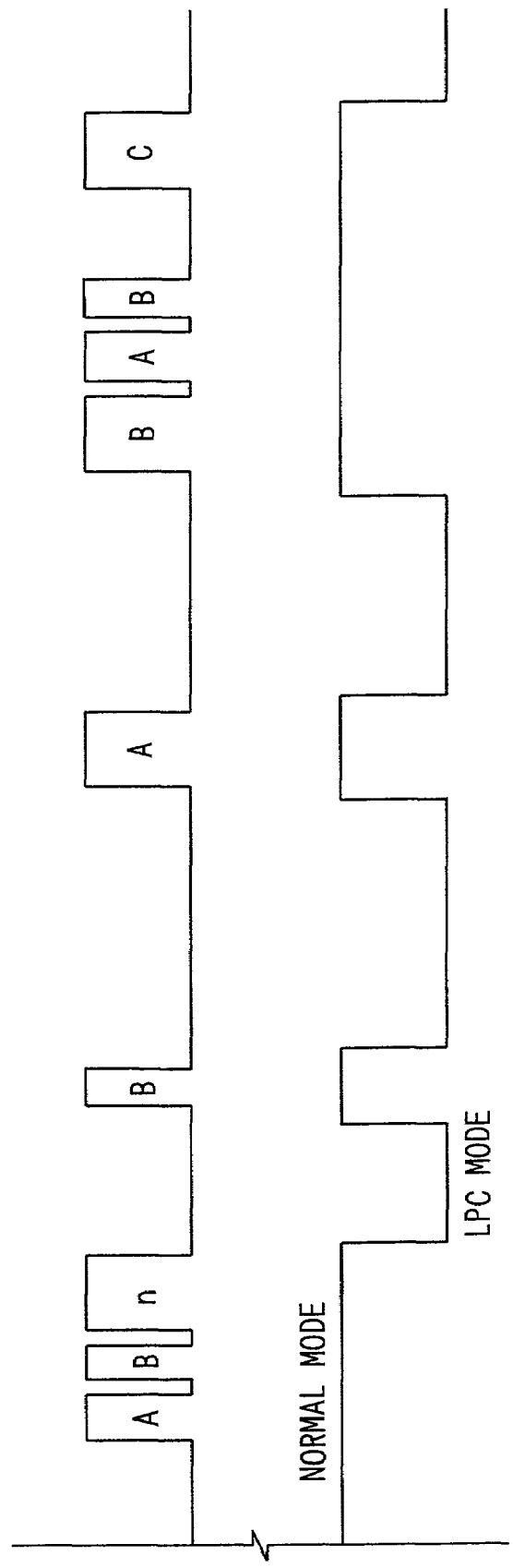
FIG. 4 is a graph showing how the RTOS dispatches a plurality of tasks and switches the CPU between a normal mode and an LPC mode.

In this way, the states of the tasks are always changing depending on occurrence of interrupts and issue of system calls. Referring to FIG. 4, for example, tasks A, B, n are executed in quick succession and thereafter the task B is executed after a relatively long interval. In this case, when the execution of task A is completed, that is, when task A is switched from "running" state to "suspended" or "waiting" state, task B is in "ready" state. Therefore the RTOS starts the execution of task B immediately after the execution of task A is completed. In contrast, when the execution of task n is completed, that is, when task n is switched from "running" state to another state, no task is in "ready" state. Therefore no task is executed for a while. Thereafter task B is switched to "ready" state. Then task B is switched from "ready" state to "running" state and executed.

Figure 5:
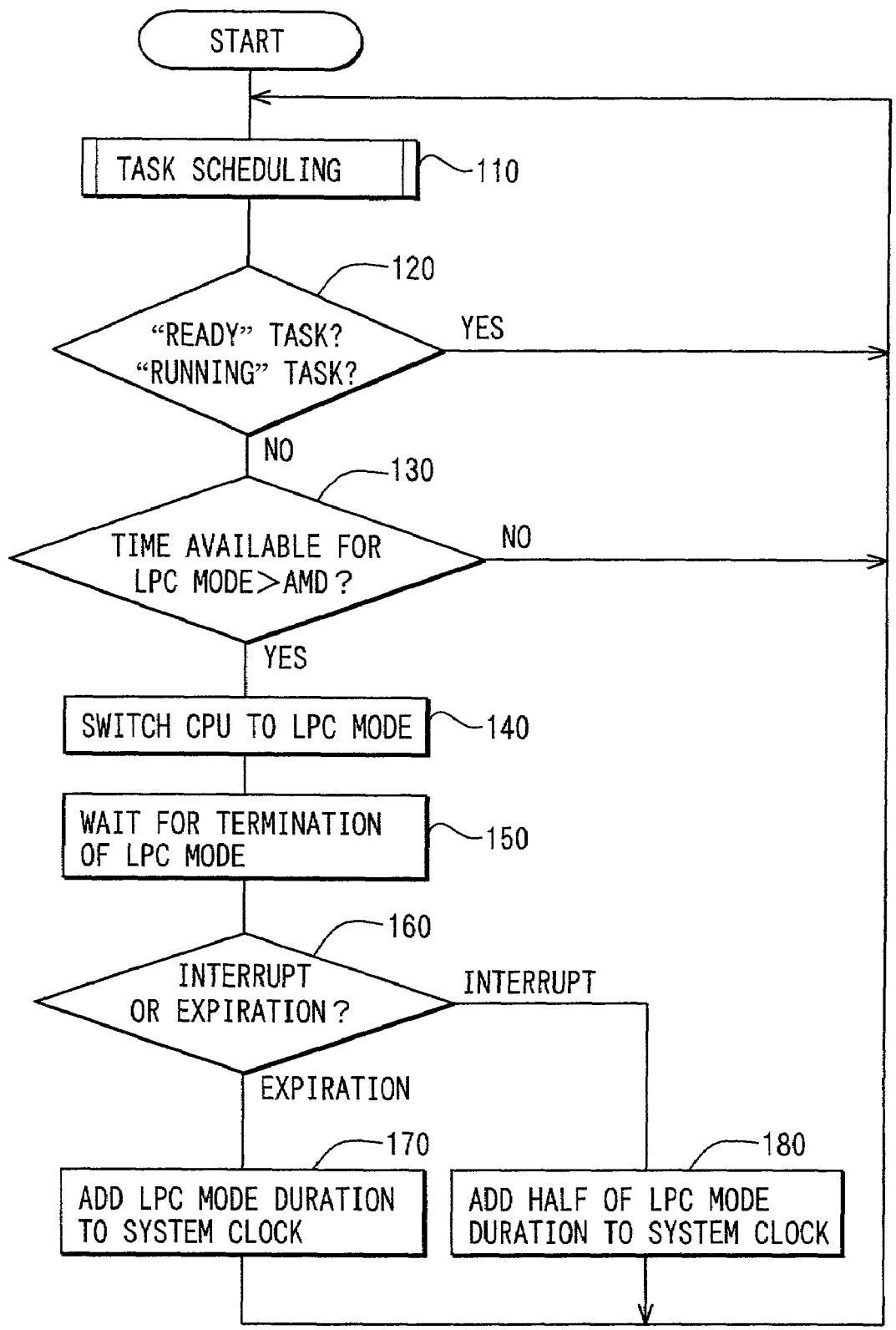
FIG. 5 is a flowchart of a process for managing the operation mode of the CPU.

The RTOS manages the operation mode of the CPU 12 as follows. Referring to FIG. 5, the tasks are scheduled at step 110 and thereafter it is determined at step 120 whether there is a "ready" task or a "running" task. If yes, the process returns to step 110 to schedule the tasks again. If not (i.e., there is no "ready" task and no "running" task), the process proceeds to step 130.

At step 130, it is determined whether the time left before a "suspended" task is switched to "ready" state based on the above condition (1) (i.e., time available for LPC mode) is larger than a predetermined time length. The predetermined time length is equal to allowable minimum duration (AMD) of the LPC mode. The time left before a "suspended" task is switched to "ready" state based on the above condition (2) or (3) is unpredictable. If a "suspended" task is switched to "ready" state based on the above condition (2) or (3), it is determined at step 120 that there is a "ready" task. Therefore the process returns to step 110 without switching the CPU 12 to the LPC mode in this case.

Alarms are prepared for the respective tasks as described above. Each of the alarms is a counter which counts down based on the value of the system clock. The system clock is implemented by software included in the RTOS. The RTOS decrements the counter by one whenever the system clock further counts five, for example. When the value of the counter vanishes, that is, the alarm expires, the RTOS switches the task corresponding to the counter from "suspended" state to "ready" state.

For example, referring to FIG. 6, the alarm A corresponding to task A is set for 100, the alarm B corresponding to task B is set for 10, and the alarm C corresponding to task C is set for 120. Assuming that the system clock counts by 1 ms, the RTOS decrements the alarms A, B, C, by one every 5 ms. That is, unit time is 5 ms in this case. The RTOS selects the alarm which is due to expire first, and compares the time left before the selected alarm expires with the AMD of the LPC mode at step 130. If it is determined at step 130 that the value of the selected alarm is larger than the AMD of the LPC mode, the process proceeds to step 140 wherein the CPU 12 is switched to the LPC mode. If it is determined at step 130 that the value of the selected alarm is equal to or less than the AMD of the LPC mode, the process returns to step 110.

In the example shown in FIG. 6, assuming that t1 indicates the time point at which step 130 is performed, the alarm B is selected and used at step 130. The time left before the alarm B expires is 5 ms×10=50 ms in this case. Assuming that the AMD of the LPC mode is 300 ms, it is determined at step 130 that the time left before the alarm B expires is less than the AMD of the LPC mode. Therefore the process returns to step 110 without switching the CPU 12 into the LPC mode in this case.

Assuming that t3 indicates the time point at which step 130 is performed in the example shown in FIG. 6, the alarm A is selected and used at step 130. The time left before the alarm A expires is 5 ms×89=445 ms in this case. It is determined at step 130 that the time left before the alarm A expires is larger than the AMD (300 ms) of the LPC mode. Therefore the process proceeds to step 140 in this case.

The AMD of the LPC mode is determined in view of the type of jobs to be executed and hardware limitations on allowable duration of the LPC mode. Further a plurality of patterns (duration of different length) for the AMD of the LPC mode may be prepared. In this case, one is; selected from the patterns at step 130 as the actually used AMD according to the measured power consumption and the measured processing power. In the case that four patterns (i.e., 2 ms, 8 ms, 32 ms, and 256 ms) are provided as sleep duration as shown in FIG. 2, these four patterns may be employed as the patterns for the AMD. That is, appropriately selected one of the four patterns may be employed as the AMD of the LPC mode used at step 130.

At step 140, the RTOS sets the wake-up timer for time shorter than the time left before the alarm first expires, and then switches the CPU 12 to the LPC mode (i.e., sleep mode) by executing a sleep instruction. In the above example, assuming that the wake-up timer can be set for one of the four patterns (i.e., 2 ms, 8 ms, 32 ms, 256 ms) as shown in FIG. 2, the RTOS sets the wake-up timer for 256 ms since the time left before alarm A expires is 445 ms. However, if the wake-up timer can be set for an arbitrary length of time, the RTOS may set the wake-up timer for 440 ms, for example.

In the LPC mode, supply of the clock to the CPU 12 is suppressed, and the wake-up timer counts down the sleep duration at step 150. In order to further reduce the power consumption, supply of the clock to the peripherals may be suppressed. The suppression of the clock supply to the CPU 12 involves temporary suspension of the system clock. If the wake-up timer expires or an interrupt occurs, the supply of the clock to the CPU 12 is resumed and the CPU 12 is switched to the normal mode. Then it is determined at step 160 whether the CPU 12 is switched to the normal mode in response to expiration of the wake-up timer or in response to occurrence of an interrupt.

If it is determined at step 160 that the CPU 12 is switched to the normal mode in response to occurrence of an interrupt, the process proceeds to step 180 wherein the value equal to the half of the sleep duration is added to the value of the system clock. Then the process returns to step 110. On the other hand, if it is determined at step 160 that the CPU 12 is switched to the normal mode in response to expiration of the wake-up timer, the process proceeds to step 170 wherein the value equal to the sleep duration is added to the value of the system clock. Then the process returns to step 110. Thus the RTOS compensates for the temporary suspension of the system clock during the LPC mode. Thereby the alarms A, B, C also keep correct values.

The operating system according to the present embodiment may be implemented by hardware. However, it may be provided in the form of a computer executable program. Such a program may be stored in a computer readable medium such as a floppy disk, a magneto-optical disk, CD-ROM, a hard disk, ROM or RAM, and may be loaded when it is necessary. Alternatively the program may be loaded via a network.

According to the present invention, the following advantages are provided. The RTOS switches the CPU 12 to the LPC mode, only when there is no "running" task and no "ready" task. Therefore the RTOS will never switch the CPU 12 to the LPC mode when the task is on execution. Further the execution of "ready" tasks will not be delayed, since the RTOS does not switch the CPU 12 to the LPC mode when there is a "ready" task.

The "suspended" tasks will not be hindered from switching to "ready" state, because the RTOS determines the duration of the LPC mode so as to be shorter than the time left before the alarm for awaking a task from "suspended" state first expires. Further the RTOS switches the CPU 12 from the LPC mode to the normal mode, when an interrupt occurs. Therefore the "suspended" task will not be hindered from switching to "ready" state in response to occurrence of an unpredictable interrupt.

Thus the power consumption in the body ECU 10 is reduced without disrupting execution of the "running" task, "ready" tasks and tasks to be awaked by the alarms. Further developers are not required to take the operation mode of the CPU 12 into consideration when they develop the application program comprised of tasks. Therefore they can readily develop the application program.

(Modifications)

Figure 7:
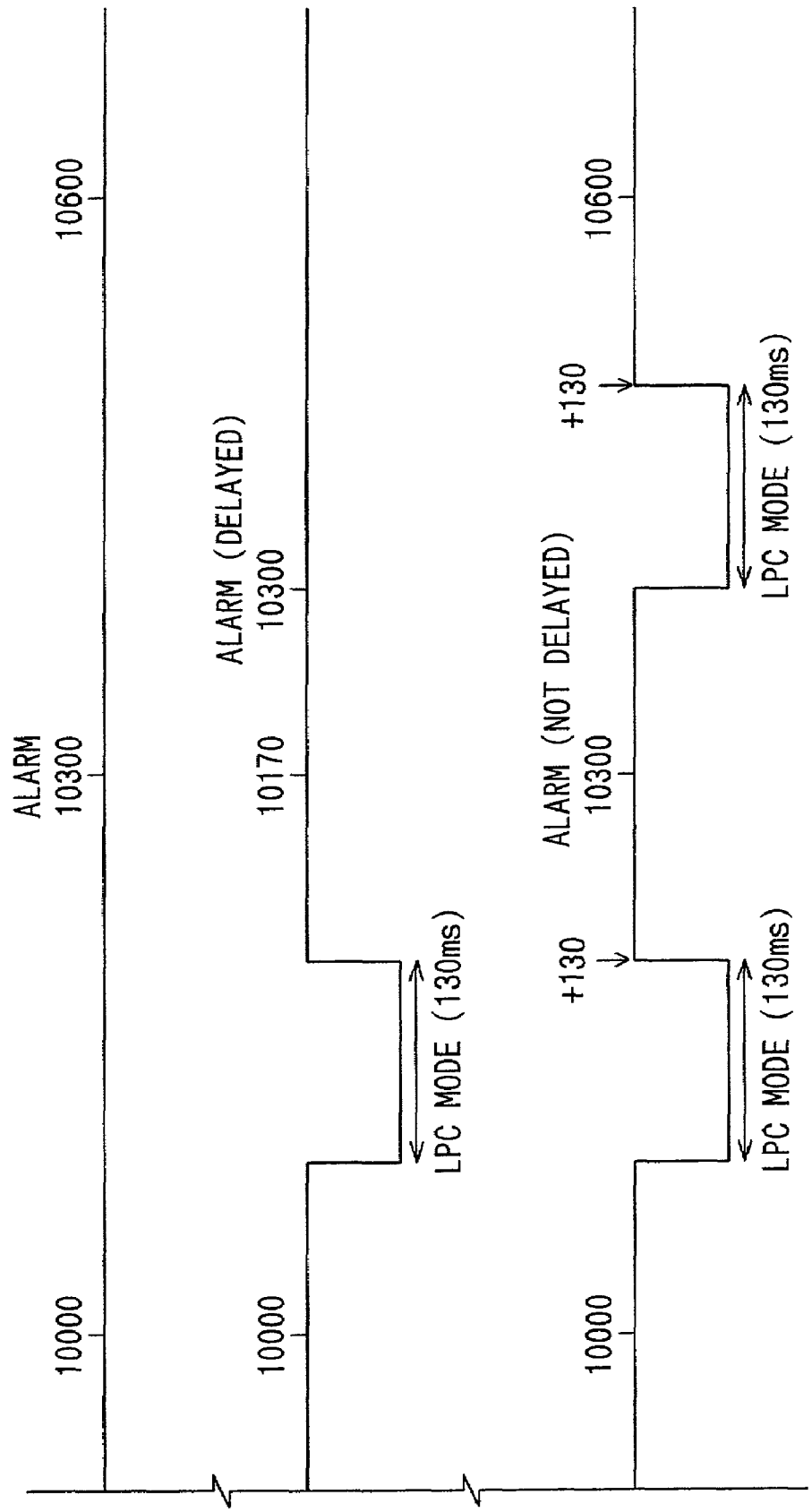
FIG. 7 is a graph showing how the alarm expires based on the value of the system clock and delay of the expiration is prevented according to a modification of the present invention.
Figure 8:
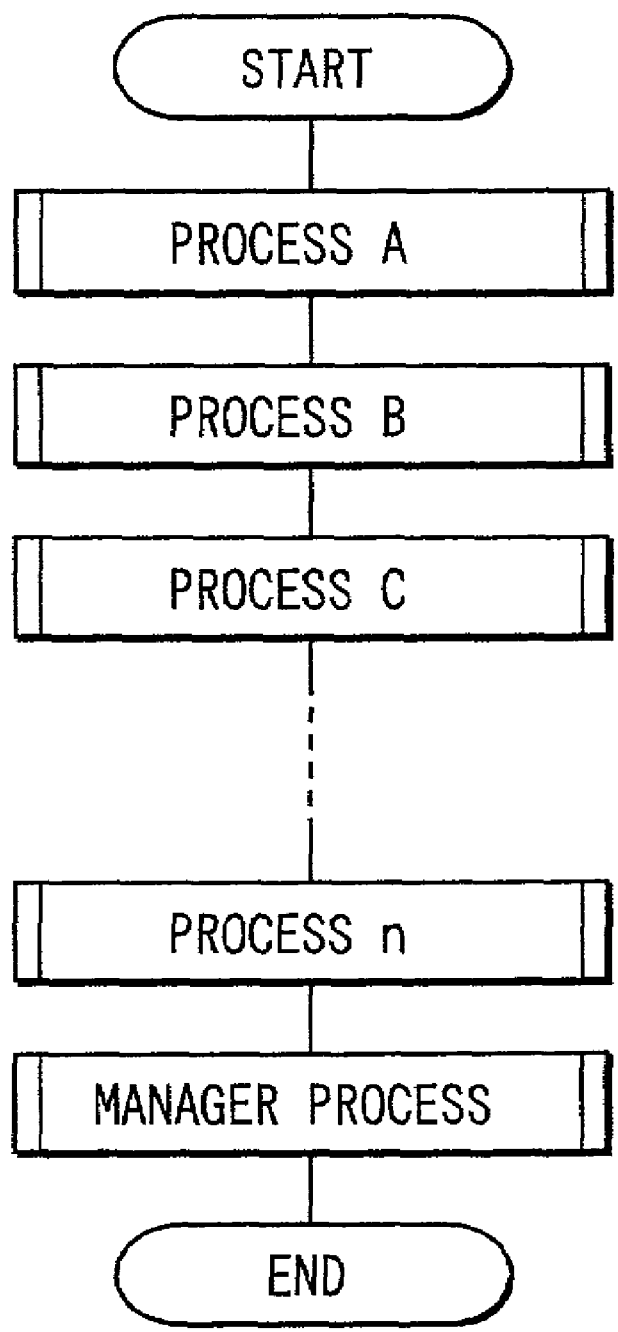
FIG. 8 is a flowchart of a process for managing the operation mode of the CPU according to related art.
Figure 9:
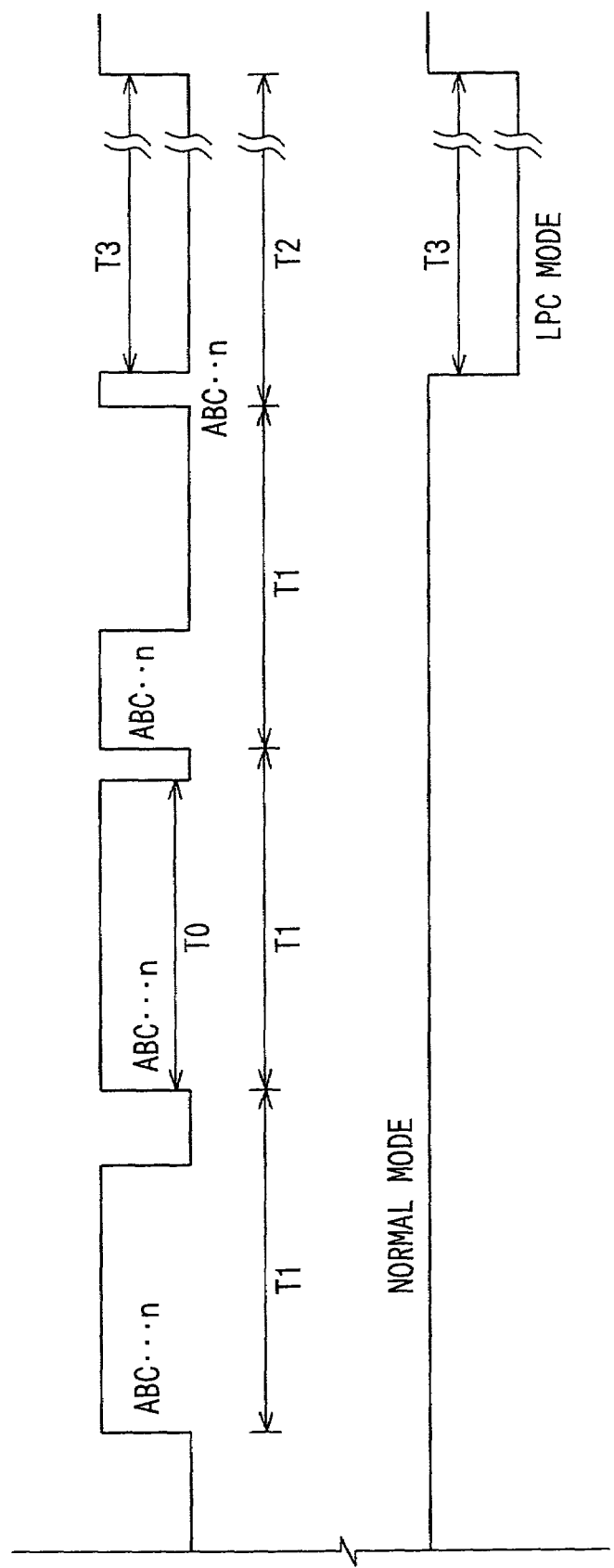
FIG. 9 is a graph showing how an operation system according to the related art switches the CPU between a normal mode and an LPC mode.

In the above embodiment, the RTOS may set the alarm so that the alarm expires when the system clock says predetermined absolute time. For example, the alarm is set so as to expire at 10300 absolute time as shown in the top line of FIG. 7. In this case, if step 170 or 180 is omitted after the previous LPC mode of a duration of 130 ms is terminated, the expiration of the alarm at 10300 absolute time is delayed as shown in the middle line of FIG. 7. If step 170 or 180 is executed after the previous LPC mode, the expiration of the alarm at 10300 absolute time is not delayed as shown in the bottom line of FIG. 7 because the downtime of 130 ms is compensated for at step 170 or 180. Accordingly step 170 or 180 should be executed after the LPC mode is terminated in order that the alarm expires at the accurate time. Moreover the RTOS may first set the alarm to zero and thereafter increment the alarm according to the system clock. In this case, the alarm expires when the value of the alarm reaches a predetermined value.

In the above embodiment, the RTOS may switch the tasks among three states, or more than four states. For example, the RTOS may switch the tasks among the states including a task creation state or an abnormal stop state, or among "running" state, "ready" state and "suspended" state. Further the RTOS may be a non-preemptive multitasking operating system instead of the preemptive multitasking operating system.

The operating system of the present invention may be used for various devices other than the body ECU 10 of the body system 100. For example, the operating system of the present invention may be used for a battery-powered device or the ECUs 20 connected to the body ECU 10 in FIG. 1. The operating system of the present invention can control the operation mode so that power consumption is reduced without disrupting execution of programs. Therefore it is effective in a device in which reduction in power consumption is highly required.

The present invention is not limited to the above embodiment and modifications;, but may be variously embodied within the scope of the invention.

What is claimed is:

1. A computer readable medium containing an operating system for controlling operation of a central processing unit (CPU) of a microcomputer, comprising:

first means for managing a plurality of tasks, wherein said plurality of tasks are switched among a running state, a ready state and a third state including at least one of a waiting state and a suspended state; and second means for switching said CPU to a low-power-consumption (LPC) mode if there is no task in the running state and no task in the ready state, wherein the switching of said CPU to the LPC mode is determined based on a predetermined allowable minimum time length of the LPC mode and an amount of time left before a task in the third state is switched to the ready state if the task is in the third state and the amount of time left before the task is switched to the ready state is known, wherein a duration of the LPC mode is set so as to be shorter than said amount of time left before the task in the third state is switched to the ready state.

2. The computer readable medium as in claim 1, wherein said CPU is switched to the LPC mode only if said amount of time left before the task in the third state is switched to the ready state is longer than the predetermined allowable minimum time length of the LPC mode.

3. The computer readable medium as in claim 1, wherein the task in the third state is switched to one of the other states if a predetermined condition is satisfied.

4. The computer readable medium as in claim 3, wherein:
it is determined whether said predetermined condition is satisfied based on a value of an alarm provided for awaking the task from the third state; and
the value of said alarm is used as the amount of time left before the task in the third state is switched to the ready state.

5. The computer readable medium as in claim 1, wherein a timer temporarily suspended during the LPC mode is compensated for the temporary suspension based on said duration of the LPC mode.

6. A computer readable medium containing a computer program for implementing an operating system on a microcomputer, said computer program causing a central processing unit (CPU) of said microcomputer to-perform a method of:

managing a plurality of tasks by switching said plurality of tasks among a running state, a ready state and a third state including at least one of a waiting state and a suspended state; and switching said CPU to an low-power-consumption (LPC) mode if there is no task in the running state and no task in the ready state, wherein the switching of said CPU to the LPC mode is determined based on a predetermined allowable minimum time length of the LPC mode and an amount of time left before one of the plurality of tasks in the third state is switched to the ready state, if the one of the plurality of tasks is in the third state and if the amount of time left before the task is switched to the ready state is known, and wherein a duration of the LPC mode is set so as to be shorter than said amount of time left before the task in the third state is switched to the ready state.

7. An electronic control unit for a vehicle comprising:

a central processing unit (CPU); and an operating system for controlling operation of said CPU, said operating system including:

first means for managing a plurality of tasks, wherein said plurality of tasks are switched among a running state, a ready state and a third state including at least one of a waiting state and a suspended state; and second means for switching said CPU to an low-power-consumption (LPC) mode if there is no task in the running state and no task in the ready state, wherein the switching of said CPU to the LPC mode is determined based on a predetermined allowable minimum time length of the LPC mode and an amount of time left before one of the plurality of tasks in the third state is switched to the ready state, if the one of the plurality of tasks is in the third state and if the amount of time left before the task is switched to the ready state is known, and wherein a duration of the LPC mode is set so as to be shorter than said amount of time left before the task in the third state is switched to the ready state.

8. A method for switching a central processing unit (CPU) to an low-power-consumption (LPC) mode in a microcomputer in which said CPU executes a program that includes a plurality of tasks, said method comprising the steps of:

scheduling said plurality of tasks by switching said plurality of tasks among a running state, a ready state and a third state including at least one of a waiting state and a suspended state; and switching said CPU to the LPC mode if there is no task in the running state and no task in the ready state, wherein said switching step includes the step of switching said CPU to the LPC mode based on a predetermined allowable minimum time length of the LPC mode and an amount of time left before a task in the third state is switched to the ready state, if the task is in the third state and if the amount of time left before the task is switched to the ready state is known; and setting a duration of the LPC mode so as to be shorter than said amount of time left before the task in the third state is switched to the ready state.

9. A method as in claim 8, wherein said switching step is performed only if the amount of time left before the task in the third state is switched to the ready state is longer than the predetermined allowable minimum time length of the LPC mode.

10. A computer-readable medium containing instructions associated with an operating system capable of being implemented on a microcomputer having a central processing unit (CPU), said instructions readable by said CPU, said instructions for causing said CPU to:

manage a plurality of tasks by switching said plurality of tasks among a running state, a ready state, and a third state including one of a waiting state and a suspended state; and switch said CPU to a low-power-consumption (LPC) mode if none of the plurality of tasks are in the running state and none of the plurality of tasks are in the ready state, wherein the switching of the CPU to the LPC mode is determined based on a predetermined allowable minimum time length of the LPC mode and an amount of a time left before a task in the third state is switched to the ready state, if the task is in the third state and the time left before the task is switched to the ready state is known, wherein a duration of the LPC mode is set so as to be shorter than said amount of time left before the task in the third state is switched to the ready state.

* * * * *